Figure 1:
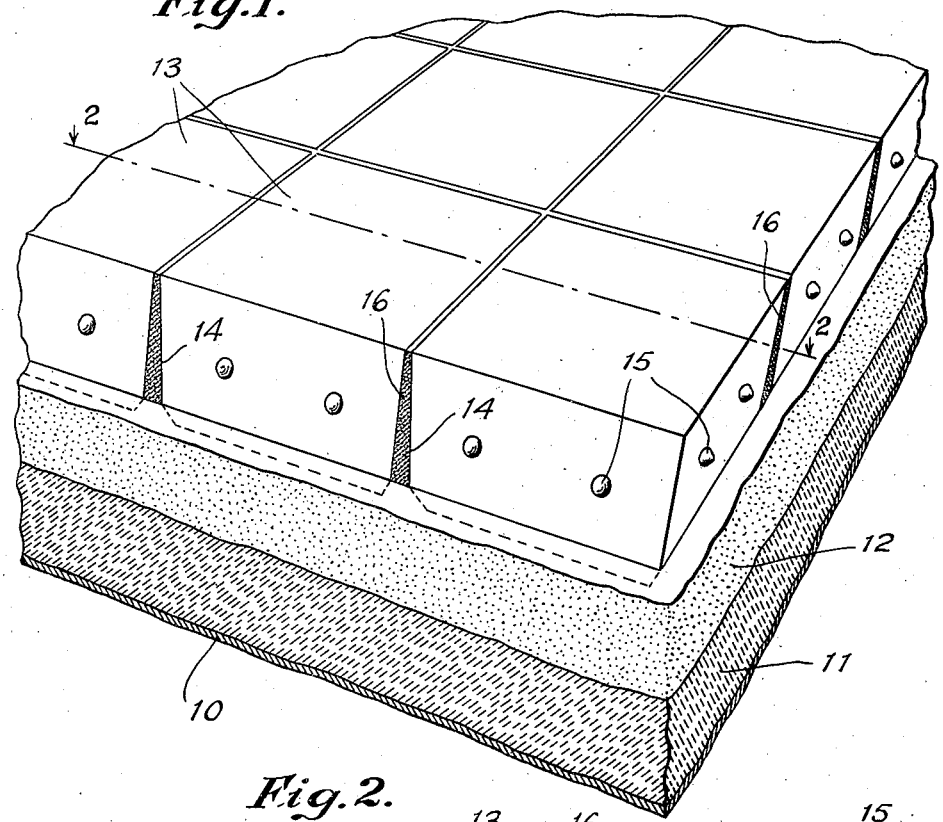

Jan. 9, 1940.    P. G. WILLETTS    2,186,223
GLASS MELTING FURNACE AND METHOD OF CONSTRUCTION THEREOF
Filed Nov. 4, 1937

Witness:
A. A. Horn

Inventor:
Paul G. Willetts
by Brown & Parham
Attorneys.

Patented Jan. 9, 1940

2,186,223

UNITED STATES PATENT OFFICE 2,186,223

GLASS MELTING FURNACE AND METHOD OF CONSTRUCTION THEREOF

Paul G. Willetts, West Hartford, Conn., assignor to Hartford-Empire Company, Hartford, Conn., a corporation of Delaware Application November 4, 1937, Serial No. 172,660

8 Claims. (Cl. 49—54)

The present invention relates to walls for glass melting furnaces, particularly to the bottoms of such furnaces and methods of making the same. Its principal object is to provide a wall structure which may be completely insulated.

Materials of high insulating value generally are not resistant to molten glass but deteriorate rapidly when brought in contact therewith. Therefore, it is essential to the employment of such materials in connection with glass furnaces to insure against their contact with the highly corrosive molten glass.

I have found that a completely insulated furnace wall employing such insulating materials may be constructed and the furnace operated at a considerable fuel saving by proper arrangement and selection of the materials going into the wall.

Preferably I provide a wall of three parts— an inner substantially impervious, glass contacting layer built up of blocks, the joints between which are filled with a material which coacts with the blocks, when the furnace is heated, to form a substantially monolithic structure, a second layer upon which the first layer rests comprising loose granular material of such characteristics that it remains in loose granular form during the heating up of the furnace, thus providing a rolling support for the first layer, but which is capable, when contacted by molten glass under the heat of the furnace, of coacting therewith to form a glass-impervious structure. The said second layer of granular material may be provided upon a third layer of insulating bricks which may be nonresistant to the action of molten glass.

In the structure described it is proposed to insure against any contact between the glass and the insulating brick primarily by the growth of the inner layer of blocks and filling material into a substantially monolithic structure, and secondly, by providing the granular material which will act to cure any leaks of molten glass into this layer, which might occur by cracking of the blocks or otherwise.

In providing the inner or glass-contacting layer of the wall, it is necessary to employ blocks which are not only resistant to molten glass, but also are of a character such that they will not substantially decrease in volume under the continued application of the furnace heat. Preferably these blocks are of a composition such that they give up some part of their glassy matrix to the filling material when the furnace is heated. This glassy material, coacting with the filling material, causes the growth of interlocking crystals at the juncture between the filling material and the blocks so that they grow together into a monolithic structure. An example of blocks having the beforementioned characteristics and suitable for my purpose are the electrocast mullite blocks supplied by the Corhart Refractories Co., Louisville, Kentucky. Obviously other blocks having the stated characteristics may be employed in carrying out the invention.

As a filler for the space between the blocks, I prefer to prepare a slip of refractory granular material including small quantities of clay and suitable deflocculants. The refractory granular material is preferably employed in such graded grain sizes as to permit a casting into the spaces between blocks of the largest possible amount of solids. The refractory filling material should have little if any shrinkage when heated, and should be capable of reaction with the glassy matrix of the blocks, so that the blocks and filling material may grow together into a monolith. A suitable slip may be prepared from

| | |
|---|---|
| Tabular corundum of such size as will pass through an 8-mesh but remain on a 14-mesh standard screen___parts by weight__ | 33 |
| Tabular corundum of such size as will pass through a 24-mesh but remain on a 30-mesh screen_____parts by weight__ | 27 |
| Tabular corundum of such size as to pass through 100-mesh screen__parts by weight | 31 |
| Ball clay Tennessee # 5_____parts__ | 4 |
| Edgar kaolin_____do____ | 5 |
| Silicate of soda_____per cent__ | .15 |
| Sodium carbonate_____do____ | .15 |
| Water_____ 10 per cent or less | |

Another suitable slip may be made by substitution of grain or electrocast mullite material for the tabular corundum of the foregoing mix.

The loose granular layer upon which the blocks are set may be composed of a properly burned grog of the alumina silica class, preferably containing relatively large proportions of alumina, say from 30 to 95 parts. A granular material which will give excellent results may be made of:

| | Parts by weight |
|---|---|
| Georgia white bauxite_____ | 58 |
| White monohydrate of alumina_____ | 25 |
| Clay known as G-1, as furnished by the Savannah Clay Co., Savannah, Georgia__ | 11 |
| Commercial feldspar_____ | 6 | as starting ingredients. These materials are ground to impalpable fineness in a ball mill.

They are assembled into a plastic body by the well-known commercial pugging and extruding method into a "dobbie" shape for proper handling and drying. When dried these "dobbies" are placed in a kiln wherein they are calcined to a temperature in excess of 2800° F. They are then permitted to cool and are broken down into grains of the size of ¼″ or smaller.

In preparing the furnace bottom wall, I first lay upon a suitable support insulating brick or other insulating material, and on this layer I provide a layer (preferably 2″ or more deep) of granular material, and on this I place a course of glass-resistant blocks as, for example, the electrocast mullite blocks abovementioned. I then prepare a slip of the filling material and apply the same in the joints between the blocks. As the base upon which the slip is cast comprises granular material, the latter will absorb some of the water of the slip and permit repeated castings of the slip material. I prefer the slip casting method of filling the joints, as I have found that it assures a more intimate contact between the blocks and the filling material, which facilitates the sealing of the joints and the growth of the filling material and the blocks into a substantially monolithic structure. However, the present invention is not necessarily limited to slip casting, but the filling material may be brought into intimate contact with the blocks by tamping or in any other known manner.

Figure 2:
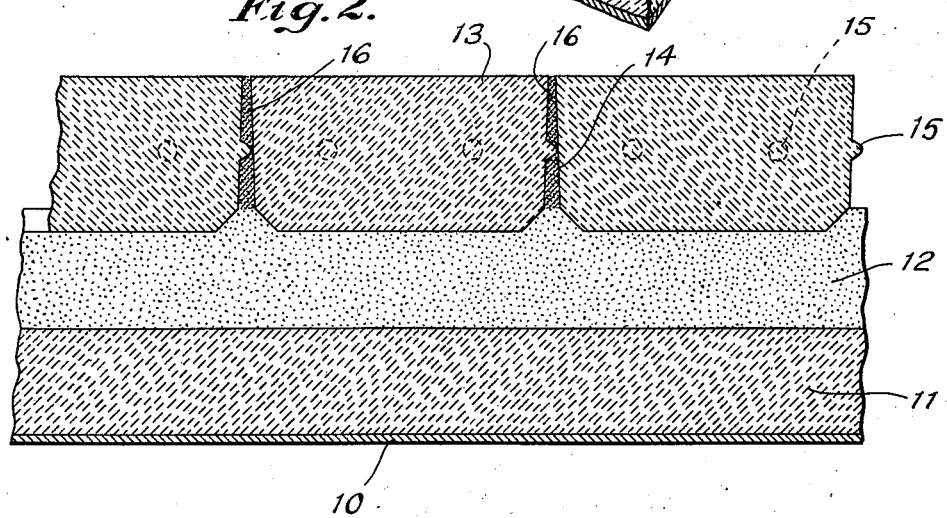

In the accompanying drawing I have illustrated a portion of the bottom for a glass melting furnace made in accordance with my invention, Fig. 1 showing the same in perspective and Fig. 2 being a vertical section taken on the line 2—2 of Fig. 1.

On a suitable bottom support 10 is placed a layer of insulating brick 11 on which a layer of granular alumina-silica material 12 is provided. Glass-resistant blocks 13 of electrocast mullite or similar material are laid in the granular material. The blocks may, if desired, be tapered downwardly as indicated at 14 and may be uniformly spaced apart by means of buttons 15 cast onto the sides of each block. By this arrangement the joints between the blocks may widen toward the bottom of the furnace, which tends to facilitate the casting of the slip. Repeated casts of the filling material are made to completely fill the joints between the blocks. Upon the heating of the furnace prior to the introduction of the glass to be melted therein, the filling material 16 coacts with glass from the blocks. This reaction causes an intergrowth of crystals and transforms the blocks and filling material into a substantially monolithic glass-impervious layer. Should there be any failure to completely seal the joints in the glass-contacting layer, or should cracks develop in the blocks through which the molten glass may penetrate, such glass will come into contact with the layer of granular material 12 and it will coact with that material to seal the leak and prevent the molten glass from passing to and attacking the insulating material, or from spreading under the blocks 13.

My invention is not limited to the particular materials nor to the particular number of layers to be employed. Various block materials may be substituted as long as the same do not shrink upon continued heating, and as long as they will coact with the filling material. Similarly the filling material and its manner of application may be varied as long as the same is maintained in intimate contact with the blocks and is capable of conversion through its coaction with the block under the heat of the furnace.

The layer of granular material 12 is itself a good insulator, and its depth may be varied as desired. Additional quantities of this material may be substituted for the insulating blocks 11. Also the composition of granular material may be varied as long as the material may furnish the rolling support and be capable of reacting with molten glass to prevent leakage.

The present application is a continuation in part of applicant's copending application, Serial No. 91,105, filed July 17, 1936, for Container for molten glass and method of constructing same, and carries all claims readable on both applications, the claims of said copending application being restricted to the embodiment of the invention specifically disclosed therein and not supported by the present disclosure.

Having described my invention, I claim:

1. The method of forming an insulated glass furnace bottom, which comprises providing a layer of insulating material, placing a layer of granular material thereon, placing upon the granular material a layer of glass-resistant, non-shrinking refractory blocks having a glassy matrix phase which is separable when heated, filling the spaces between said blocks by casting therein a slip containing refractory grains capable of reacting with the glassy matrix phase of the blocks, and heating the bottom as thus prepared to cause the blocks to free a portion of the glassy matrix phase for reaction with the slip to weld the blocks and the slip into a substantially monolithic structure.

2. The method of forming an insulated glass furnace bottom which comprises providing an undersupport for said bottom, placing a layer of granular material thereon, placing upon the granular material a layer of glass-resistant, non-shrinking refractory blocks having a glassy matrix phase which is separable when heated to a temperature approximating that which the blocks attain during normal furnace operation, filling the spaces between said blocks with granular refractory material capable of reacting with the glassy matrix phase of the blocks at such temperature, and heating the bottom as thus prepared to cause the blocks to free a portion of the glassy matrix phase for reaction with the filling material to weld the blocks and the filling material into a substantially monolithic structure.

3. A bottom wall for a glass melting furnace, comprising a support, an underlayer of insulating material on said support, and an inner layer of formed refractory blocks of electrocast alumina-silica material which do not shrink substantially when heated in the furnace and which contain a glassy matrix capable of separation from the remainder of the blocks by furnace heat, said blocks being welded together by refractory filling material of such character as to maintain intimate contact with the blocks during the initial heating of the furnace and to coact with the glassy matrix material of the blocks to form a substantially monolithic inner layer.

4. A bottom wall for a glass melting furnace in accordance with claim 3, wherein said insulating material beneath said monolithic inner layer comprises a layer of loose granular material of such character as to coact with glass at the temperature of the molten glass to form a glass-impervious body.

5. A bottom wall for a glass melting furnace, comprising an undersupport, a layer of loose granular material of the alumina-silica class supported by said undersupport, an inner layer supported by said loose granular material and formed of electrocast mullite blocks having a glassy matrix phase which is separable therefrom at a temperature approximating that which is attained by said blocks during the normal operation of the furnace, and filling material between said blocks to weld them together which will react with the separable glassy matrix phase of the blocks to form mullite.

6. A bottom wall for a glass melting furnace, comprising an inner layer constructed of electrocast alumina-silica refractory blocks, which contain a glassy matrix capable of separation from the remaining material of the blocks on heating to a temperature approximating that which is attained by said blocks during the normal operation of the furnace, said blocks being welded together by material placed in the joints therebetween as a non-coherent mass, including grains of aluminous material and plastic clay, the blocks and said material being transformed into a substantially monolithic inner layer during the heating of the furnace.

7. A bottom wall for a glass melting furnace, comprising a bottom support, a layer of insulating material thereon, and an upper layer formed of blocks of electrocast alumina-silica material welded together upon the heating of the furnace by slip cast material in the joints therebetween comprising a major portion of aluminous grains and a minor portion of plastic clay.

8. A container for molten glass, comprising a bottom including an under support, and an inner portion formed of refractory blocks resistant to the attack of molten glass, granular material disposed between said under support and said blocks and of such character as to remain granular during the heating up of said blocks to the highest temperature which they attain during normal use, and material disposed between said blocks of such character that it will seal the joints therebetween and prevent penetration of molten glass through the joints between the blocks to the granular material thereunder.

PAUL G. WILLETTS.